(12) United States Patent
Kukielka

(10) Patent No.: US 9,422,785 B2
(45) Date of Patent: Aug. 23, 2016

(54) INTERNAL BLOW OUT PREVENTER

(71) Applicant: National Oilwell Norway AS, Kristiansand S (NO)

(72) Inventor: Slawomir Kukielka, Kristiansand (NO)

(73) Assignee: National Oilwell Norway AS, Kristiansand S (NO)

(*) Notice: Subject to any disclaimer, the term of this patent is extended or adjusted under 35 U.S.C. 154(b) by 0 days.

(21) Appl. No.: 14/580,342

(22) Filed: Dec. 23, 2014

(65) Prior Publication Data

US 2015/0108377 A1 Apr. 23, 2015

Related U.S. Application Data

(63) Continuation of application No. 13/521,564, filed as application No. PCT/NO2011/000010 on Jan. 10, 2011, now Pat. No. 8,950,430.

(30) Foreign Application Priority Data

Jan. 11, 2010 (NO) .................................. 20100037

(51) Int. Cl.
*E21B 33/08* (2006.01)
*E21B 34/00* (2006.01)
*F16K 11/12* (2006.01)
(Continued)

(52) U.S. Cl.
CPC .............. *E21B 33/085* (2013.01); *E21B 21/106* (2013.01); *E21B 34/00* (2013.01); *F16K 5/0605* (2013.01); *F16K 5/20* (2013.01); *F16K 11/087* (2013.01); *F16K 11/12* (2013.01); *E21B 2034/002* (2013.01); *Y10T 137/5983* (2015.04); *Y10T 137/8803* (2015.04); *Y10T 137/88022* (2015.04)

(58) Field of Classification Search
CPC ....... F16K 11/085; F16K 11/087; F16K 5/04; F16K 5/08; F16K 11/12; F16K 5/0207; F16K 27/065; F16K 5/0605; F16K 5/20; E21B 33/085; E21B 21/106; E21B 34/00
USPC .......................... 137/614.16–614.18, 315.02
See application file for complete search history.

(56) References Cited

U.S. PATENT DOCUMENTS 661,175 A 11/1900 Haigh
1,911,280 A * 5/1933 Hoffman ............... F16K 5/0442
137/614.11
(Continued)

FOREIGN PATENT DOCUMENTS

WO 97/13389 A1 4/1997

OTHER PUBLICATIONS

PCT/NO2011/000010 International Search Report and Written Opinion dated Apr. 27, 2011 (5 p.).
(Continued)

*Primary Examiner* — Kevin Lee
(74) *Attorney, Agent, or Firm* — Conley Rose P.C.

(57) ABSTRACT

An internal blow out preventer for use in a drill string, comprising a housing having an outer valve closure element and where the outer valve closure element is configured to be moved between an open and a closed position, wherein the outer valve closure element is provided with an inner valve closure element that is configured to be moved between an open and a closed position inside the outer valve closure element.

18 Claims, 5 Drawing Sheets

(51) Int. Cl.
*F16K 11/087* (2006.01)
*E21B 21/10* (2006.01)
*F16K 5/06* (2006.01)
*F16K 5/20* (2006.01)

(56) References Cited

U.S. PATENT DOCUMENTS

| | | | |
|---|---|---|---|
| 2,997,057 A | | 8/1961 | Toth |
| 3,700,003 A | * | 10/1972 | Smith ................... F16K 5/0207 137/614.17 |
| 5,690,142 A | | 11/1997 | Moody |
| 6,328,052 B1 | | 12/2001 | Loyning |
| 8,220,488 B2 | | 7/2012 | McCully |
| 8,584,705 B2 | | 11/2013 | Hughes et al. |
| 2006/0191679 A1 | | 8/2006 | Seneviratne et al. |
| 2007/0007483 A1 | | 1/2007 | Leblanc et al. |
| 2012/0248359 A1 | * | 10/2012 | Dederich ................ F16K 31/54 251/248 |

OTHER PUBLICATIONS

Office Action dated Apr. 11, 2014; U.S. Appl. No. 13/521,564 (6 p.).
Response to Office Action dated Apr. 11, 2014; U.S. Appl. No. 13/521,564; Response Filed Jun. 10, 2014 (14 p.).
Notice of Allowance dated Oct. 8, 2014; U.S. Appl. No. 13/521,564 (5 p.).

* cited by examiner

INTERNAL BLOW OUT PREVENTER

CROSS REFERENCE TO RELATED APPLICATIONS

This application is a continuation of U.S. application Ser. No. 13/521,564 filed Aug. 27, 2012, now U.S. Pat. No. 8,950,430, entitled "Internal Blow Out Preventer," which is a 35 U.S.C. §371 national stage application of PCT/NO2011/000010 filed Jan. 10, 2011, which claims the benefit of Norwegian Application No. 20100037 filed Jan. 11, 2010, all of which are incorporated herein by reference in their entireties for all purposes.

STATEMENT REGARDING FEDERALLY SPONSORED RESEARCH OR DEVELOPMENT

Not applicable.

BACKGROUND

1. Field of the Disclosure

There is presented an internal blow out preventer. More precisely there is presented an internal blow out preventer for use in a drill string, comprising a housing with a valve closure element and associated seals, wherein the valve closure element is configured to be moved between an open and a closed position.

2. Background of the Technology

The primary function of an Internal Blow Out Preventer (IBOP) is to shut off the mud (drilling fluid) passage on the inside of a drill string in the event well pressure exceeds limits during drilling operations on a drill rig.

However, the IBOP is also frequently used to prevent spillage of drilling fluids during each instance the top drive of the drill rig is disconnected from the drill string, e.g. each instance a new pipe or section of pipes is added to the drill string. This secondary function of the IBOP as a "mud saver" results in increased wear of the seals of the valve that has several un-desirable consequences.

One disadvantage is reduced service life of the IBOP valve, leakage when the valve is being used as mud saver after pressure testing, risk of rig downtime earlier than predicted, and more frequent need for seal replacements.

Although the use of two individual valves would solve the above problems, that solution would require additional space in the drill stem of the top drive (drilling machine), space which is not always available. The length of the drill stem located between the top drive and drill string, is limited by the travel of the top drive pipe handler, which needs to be able to grip around the box of the uppermost pipe of the drill string, just below the drill stem.

A normal set up of the drill stem between the top drive and drill string includes a cross-over sub, a remotely operated IBOP, and a second IBOP, the second IOBP being used as a closing valve at the upper end of the drill string remaining in the well and disconnected from the top drive, and a saver sub that takes the wear and damage of threads when the top drive and the drill string are connected or disconnected.

The IBOP is normally a ball valve, with the advantage that sealing has a radial symmetry, making it relatively easy to manufacture.

This disclosure relates to apparatuses intended to address at least some of the disadvantages of the prior art.

BRIEF SUMMARY OF THE DISCLOSURE

There is presented an internal blow out preventer for use in a drill string, the internal blow out preventer comprising a housing with a valve closure element and associated seals and where the valve closure element is configured to be moved between an open and a closed position, wherein the valve closure element is provided with an inner valve closure element that is configured to be moved between an open and a closed position inside the outer valve closure element.

A valve body is provided with an additional inner valve closure element which is operated independently of the outer valve closure element enabling the mud saving operation without compromising the sealing performance of the IBOP and without the need for additional length of the drill stem, i.e. between the top drive and drill string.

The flow area of the inner valve closure element may be comparable to, substantially equal to or equal to the flow through area of the outer valve closure element. Thus the inner valve closure element will not restrict flow through the IBOP when fully open.

The outer valve closure element may be separable, and a junction between a first part and a second part may be positioned so as to be out of contact with the seals during movement between the open and the closed position. This feature is intended to decrease wear of the seals that might otherwise occur.

The inner valve closure element may have a spherical or cylindrical form. Shaped as a ball, the inner valve closure element maintains certain benefits of using flat, circular seas. However, it may be more challenging mechanically to fit a ball rather than a cylinder inside another ball. Shaped as a cylinder, the inner valve closure element requires more complex machining to accommodate seals but eases the machining of the inner valve closure element and improves the structural integrity of the outer valve closure element. It is worth mentioning that small leaks during mud saving operations are generally acceptable and may permit less stringent machining tolerances.

The outer and inner valve closure elements may be rotatable about a common axis of rotation.

Certain embodiments of the valve described herein are intended to address problems of reduced service life for the IBOP seals as the valve closure element remains stationary while the inner valve closure element is closed for the mud saving operation.

BRIEF DESCRIPTION OF THE DRAWINGS

An example of an embodiment of an IBOP is explained with reference to the enclosed drawings, where.

DETAILED DESCRIPTION OF THE DISCLOSED EMBODIMENTS

Figure 1:
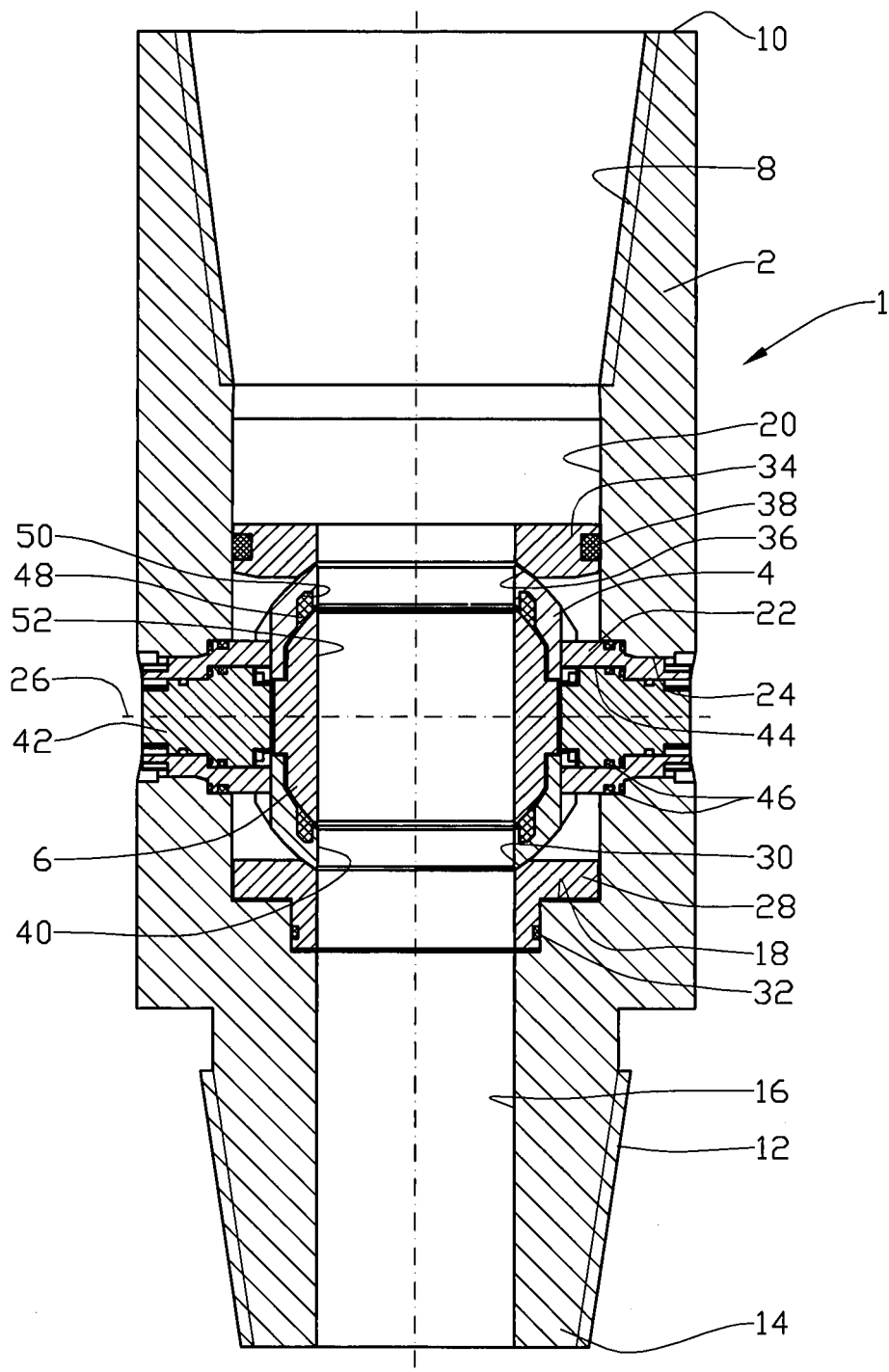
FIG. 1 shows a cross section of an internal blow out preventer, IBOP, according to the disclosure herein.

On the drawings the reference number 1 denotes an internal blow out preventer comprising a housing 2, a spherical outer valve closure element 4 and a spherical inner valve closure element 6.

The housing 2 in this embodiment is provided with internal threads 8 at its upper end portion 10 and external threads 12 at its lower end portion 14 in order to connect to a pin/box configuration of a not shown Top Drive drill stem.

'Upper' and 'lower' here refers to the IBOP in its normal working position as shown on the drawings.

A central, longitudinal bore 16 extends between the two end portions 10, 14. The bore 16 corresponds with a bore of the not shown drill string.

A shoulder 18 is formed in the bore 16 as an upper portion 20 of the bore 16 has a larger diameter than the rest of the bore 16.

The outer valve closure element 4 is positioned in the upper portion 20 of the bore 16 and connected to two hollow shafts 22 that are protruding through shaft openings 24 in the housing 4. The outer valve closure element 4 and the hollow shafts 22 are rotatable about axis 26. One of the hollow shafts 22 is connected to a not shown first actuator.

A lower ring 28 that abuts the shoulder 18, is provided with a first sealing surface 30 that is configured to seal against the outer valve closure element 4. A lower ring seal 32 provided in the lower ring 28 prevents fluid flow between the lower ring 28 and the body 2.

An upper ring 34, placed above the outer valve closure element 4, is provided with a second sealing surface 36 that is configured to seal against the outer valve closure element 4. An outer ring seal 38 provided in the upper ring 34 prevents fluid flow between the upper ring 34 and the body 2.

The first sealing surface 30 and the second sealing surface 36 constitute the outer valve sealing surfaces.

The outer valve closure element 4 has an opening 40, with an area comparable, substantially equivalent to or equal to the cross section area of the lower portion of bore 16.

The inner valve closure element 6 is positioned inside the outer valve closure element 4 and connected to two shafts 42. Each of the shafts 42 extend through a concentric bore 44 in the respective hollow shafts 22. The inner valve closure element 6 and the shafts 42 are rotatable about axis 26.

A not shown second actuator is connected to one of the shafts 42.

Seals 46 prevent fluid from flowing between the hollow shafts 22 and the housing 2 and between the hollow shafts 22 and the shafts 42.

Inner valve seals 48 positioned in corresponding recesses 50 inside the outer valve closure element 4 prevent fluid from passing between the outer valve closure element 4 and the inner valve closure element 6.

The inner valve closure element 6 has an opening 52 of comparable, substantially equal or equal cross section area to that of the opening 40 of the outer valve closure element 4.

Figure 2:
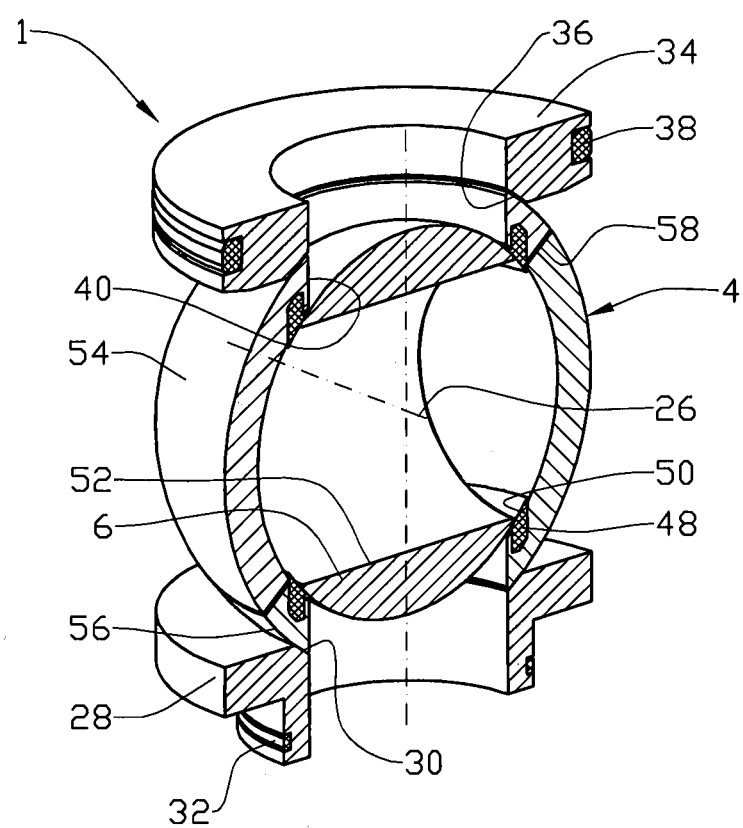
FIG. 2 shows a larger scale cross section of IBOP parts when used as a mud saver.

In an embodiment as shown in FIG. 2, the outer valve closure element 4 is made of a first valve segment 54 and a second valve segment 56.

After the inner valve seals 48 and the inner valve closure element 6 are positioned inside the outer valve closure element 4, the first and second valve segments 54, 56 are joined at an interface 58 using bolts 60.

Figure 3:
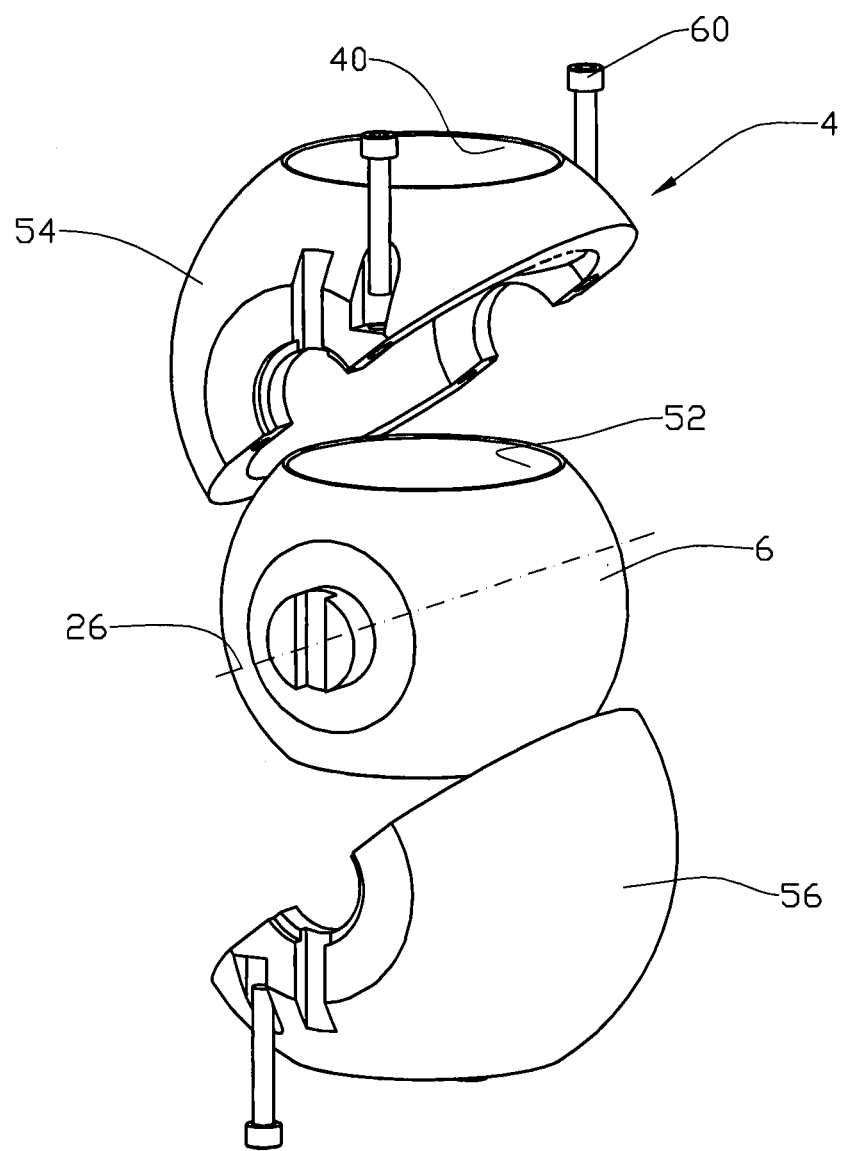
FIG. 3 shows the IBOP in an exploded view.
Figure 4:
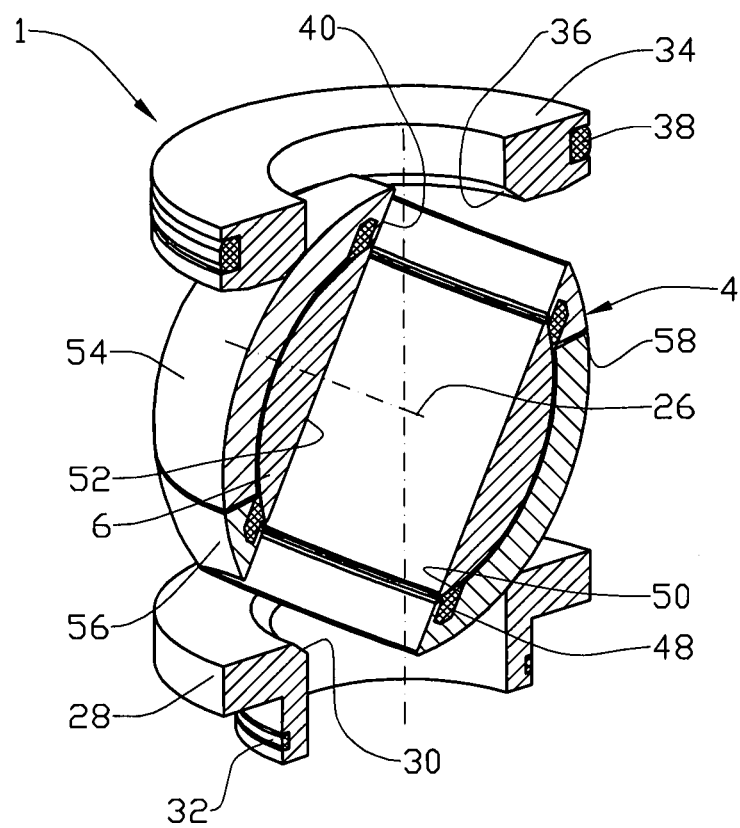
FIG. 4 shows a cross section of the IBOP in an initial stage of closing as a blow out preventer.
Figure 5:
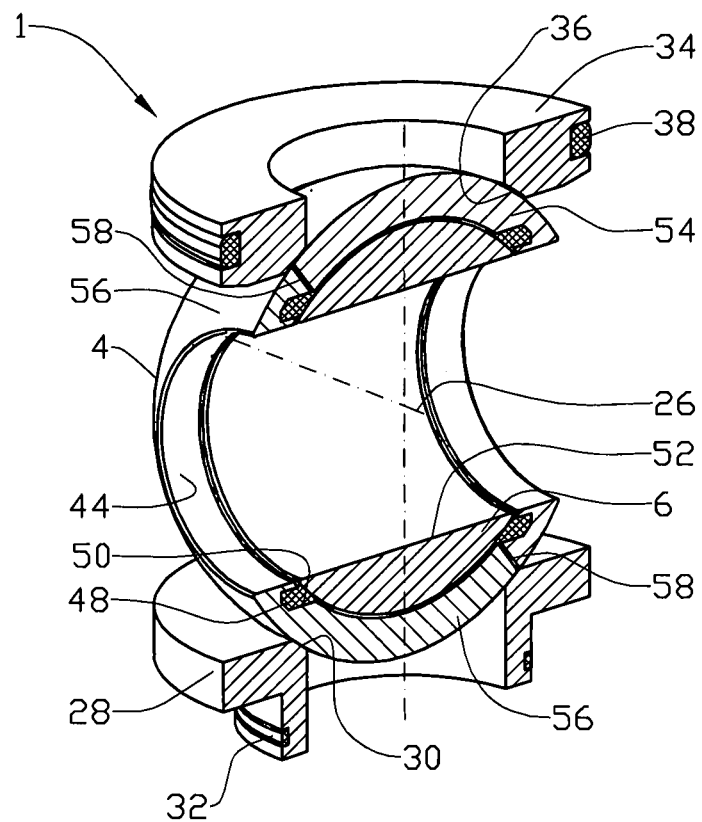
FIG. 5 shows the same as in FIG. 4 in the completely closed position.

In FIGS. 3 to 5 the housing 2 is removed in order to better show the operating functions of the IBOP 1.

When used as a mud saver, the inner valve closure element 6 of the IBOP 1 is rotated about axis 26 to close the valve opening 40 thus preventing mud from flowing through the IBOP 1, see FIG. 2.

The outer valve closure element 4 is not turned, and no wear is caused on the first and second sealing surfaces 30 and 36.

When used as an IBOP, the inner valve closure element 6 is placed in the open position, see FIGS. 4 and 5. The inner valve body seals 48 are thus not utilised for IBOP mode of operation.

The outer valve closure element 4 is rotated about axis 26 to a closed position, see FIG. 5, preventing flow through the IBOP 1. The first and second sealing surfaces 30 and 36, not subject to wear from mud saver use, function as a reliable, leak-proof barrier against the well pressure.

The interface 58 does not pass over the sealing surfaces 30, 36 during closing or opening of the outer valve closure element 4.

The invention claimed is:

1. An internal blow out preventer comprising:
   a housing having a central axis and a bore extending axially therethrough;
   a spherical outer valve closure element rotatably disposed in the housing, wherein the outer valve closure element is configured to move between an open position and a closed position; and
   a spherical inner valve closure element rotatably disposed within the outer valve closure element, wherein the inner valve closure element is configured to move between an open position and a closed position within the outer valve closure element;
   wherein the outer valve closure element comprises a pair of radially extending shafts rotatably coupled to the housing.

2. The internal blow out preventer of claim 1, further comprising a first ring coaxially disposed in the housing axially adjacent the outer valve closure element, wherein the first ring includes an annular sealing surface that slidingly engages the outer valve closure element and is configured to seal against the outer valve closure element.

3. The internal blow out preventer of claim 2, further comprising a second ring coaxially disposed in the housing axially adjacent the outer valve closure element, wherein the second ring includes an annular sealing surface that slidingly engages the outer valve closure member and is configured to seal against the outer valve closure element.

4. The internal blow out preventer of claim 1, wherein the outer valve closure element comprises a bore extending therethrough, and wherein the outer valve closure element is configured to rotate about an axis of rotation between the open position and the closed position;
   wherein the inner valve member comprises a bore extending therethrough, and wherein the outer valve closure element is configured to rotate about the axis of rotation between the open position and the closed position.

5. The internal blow out preventer of claim 1, wherein a flow area of a valve opening of the inner valve closure element is substantially the same size as a flow area of a valve opening of the outer valve closure element.

6. The internal blow out preventer of claim 1, wherein the outer valve closure element comprises:
   an annular recess extending into an inner surface of the outer valve closure element; and
   an annular seal disposed within the annular recess, wherein the annular seal is configured to slidingly engage and seal against the inner valve closure element.

7. The internal blow out preventer of claim 1, wherein the inner valve closure element comprises a pair of radially extending shafts rotatably coupled to the housing and disposed within the radially extending shafts of the outer valve closure element.

8. The internal blow out preventer of claim 1, wherein the internal blow out preventer has an open configuration with the inner valve closure element in the open position and the outer valve closure element in the open position;

wherein in the open configuration the internal blow out preventer is configured to allow for the flowing of a fluid between a first end of the housing and a second end of the housing.

9. The internal blow out preventer of claim 8, wherein the internal blow out preventer has a mud saver configuration with the inner valve closure element in the closed position and the outer valve closure element in the open position;

wherein in the mud saver configuration the internal blow out preventer is configured to prevent the flowing of a fluid between a first end of the housing and a second end of the housing.

10. The internal blow out preventer of claim 8, wherein the internal blow out preventer has a blow out preventer configuration with the inner valve closure element in the open position and the outer valve closure element in the closed position;

wherein in the blow out preventer configuration the internal blow out preventer is configured to prevent the flowing of a fluid between a first end of the housing and a second end of the housing.

11. An internal blow out preventer comprising:

a housing having a first end, a second end and a central bore extending between the first end and the second end along a longitudinal axis of the housing;

an outer valve member rotatably disposed within the housing, wherein the outer valve element has a bore extending therethrough and an axis of rotation; and an inner valve member rotatably disposed within the outer valve member, wherein the inner valve member has a bore extending therethrough and an axis of rotation coaxially aligned with the axis of rotation of the outer valve member;

wherein the inner valve member has a spherical outer surface that slidingly engages an inner surface of the outer valve member;

wherein the outer valve member comprises a pair of radially extending shafts rotatably coupled to the housing.

12. The internal blow out preventer of claim 11, further comprising a first ring coaxially disposed in the housing axially adjacent the outer valve member, wherein the first ring includes a first annular sealing surface that slidingly engages the outer valve closure member and is configured to seal against the outer valve member.

13. The internal blow out preventer of claim 12, further comprising a second ring coaxially disposed in the housing axially adjacent the outer valve member, wherein the second ring includes a second annular sealing surface that slidingly engages the outer valve closure member and is configured to seal against the outer valve member.

14. The internal blow out preventer of claim 11, wherein the first annular sealing surface of the first ring slidingly engages a spherical outer surface of the outer valve member.

15. The internal blow out preventer of claim 11, wherein the outer valve member comprises:

an annular recess extending into an inner surface of the outer valve member; and an annular seal disposed within the annular recess, wherein the annular seal is configured to slidingly engage and seal against the spherical outer surface of the inner valve member.

16. The internal blow out preventer of claim 11, wherein the inner valve member comprises a pair of radially extending shafts rotatably coupled to the housing and disposed within the radially extending shafts of the outer valve member.

17. The internal blow out preventer of claim 11, wherein the internal blow out preventer has an open configuration with the inner valve member in the open position and the outer valve member in the open position;

wherein in the open configuration the internal blow out preventer is configured to allow for the flowing of a fluid through the central bore of the housing.

18. The internal blow out preventer of claim 17, wherein the internal blow out preventer has a mud saver configuration with the inner valve member in the closed position and the outer valve member in the open position;

wherein the internal blow out preventer has a blow out preventer configuration with the inner valve member in the open position and the outer valve member in the closed position;

wherein in the mud save configuration and the blow out preventer configuration the internal blow out preventer is configured to prevent the flowing of a fluid through the central bore of the housing.

* * * * *